United States Patent [19] [11] 3,925,321
Bernert et al. [45] Dec. 9, 1975

[54] POLYAMIDE COMPOSITIONS WHICH HAVE BEEN RENDERED ANTISTATIC BY THE ADDITION OF SULFOCARBOXYLIC ACID AMIDES

[75] Inventors: Claus-Rudiger Bernert, Dormagen; Eduard Radlmann, Dormagen-Hackenbroich, both of Germany

[73] Assignee: Bayer Aktiengesellschaft, Leverkusen-Bayerwerk, Germany

[22] Filed: Mar. 7, 1974

[21] Appl. No.: 449,101

[30] Foreign Application Priority Data
Mar. 7, 1973  Germany............................ 2311329

[52] U.S. Cl.............. 260/78 S; 8/178 R; 57/140 R; 260/78 R; 260/78 L
[51] Int. Cl.$^2$.................... C08L 77/10; C08L 77/02
[58] Field of Search............... 260/78 R, 78 L, 78 S

[56] References Cited
UNITED STATES PATENTS

| | | |
|---|---|---|
| 2,473,924 | 6/1949 | Walker............................ 260/78 S |
| 3,190,763 | 6/1965 | Schleede et al.................. 260/78 S |
| 3,484,479 | 12/1969 | Rinkler et al..................... 260/78 S |
| 3,673,242 | 6/1972 | Rinkler et al..................... 260/78 S |

*Primary Examiner*—Harold D. Anderson
*Attorney, Agent, or Firm*—Plumley & Tyner

[57] ABSTRACT

This invention relates to film and fibre-forming polyamide compositions consisting of high molecular weight, linear aliphatic polyamides which have a reduced tendency to become electrostatically charged. They are prepared by solvent-free condensation of salts of aliphatic diamines and aliphatic dicarboxylic acids and/or lactams in which tertiary amides or diamides which contain at least one tertiary amide group obtained from sulphonatocarboxylic acids or derivatives thereof and secondary amines or monosecondary or disecondary diamines are homogeneously distributed.

3 Claims, No Drawings

POLYAMIDE COMPOSITIONS WHICH HAVE BEEN RENDERED ANTISTATIC BY THE ADDITION OF SULFOCARBOXYLIC ACID AMIDES

This invention relates to film and fibre-forming polyamide compositions consisting of high molecular weight, linear aliphatic polyamides which have a reduced tendency to become electrostatically charged. They are prepared by solvent-free condensation of salts of aliphatic diamines and aliphatic dicarboxylic acids and/or lactams in which tertiary amides or diamides which contain at least one tertiary amide group obtained from sulphonatocarboxylic acids or derivatives thereof and secondary amines or monosecondary or disecondary diamines are homogeneously distributed.

The electrostatic charge on high molecular weight substances restricts the use of products produced from these substances because they are easily soiled because they attract dust and because there is a risk of sparking. When such substances are used as textile fibres, the tendency of garments produced from such textiles to stick to the body of the wearer and the electric discharges which occur when a person walks over synthetic floorings made of such fibres are unpleasant. Static charges may also give rise to difficulties and dangers when the high polymers are being processed.

Methods of overcoming these disadvantages by applying or incorporating anstatically active compounds are already known. Additives consisting of polyethylene oxide or of compounds which contain polyethers have become established for use in all high polymer substances by virtue of their efficient antistatic action in low doses. Unfortunately, however, antistatics of this type have the effect, in particular in fibres and sheet materials, of considerably reducing the resistance to the yellowing action of light and heat. Moreover, the additives are very liable to give trouble when the polymers are being worked up, especially in the case of fibres where difficulties occur, e.g. in the spinning and stretching processes. There is therefore a demand for antistatic substances which would combine the advantage of polyether derivatives of being efficient in small quantities with the advantage of stability to light and heat. Antistatic polyamide compositions consisting of low molecular weight polyamides which contain tertiary amide groups are already known for this purpose (see e.g. German Offenlegungsschrift No. 1,794,167 which corresponds to British Patent No. 1,237,589).

This invention relates to an antistatic polyamide composition comprising an aliphatic polyamide and 0.5 – 20% by weight, based on the polyamide composition, of a sulphonatocarboxylic acid amide represented by one of the following general formulae

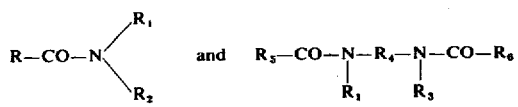

wherein

R denotes a group represented by one of the following formulae

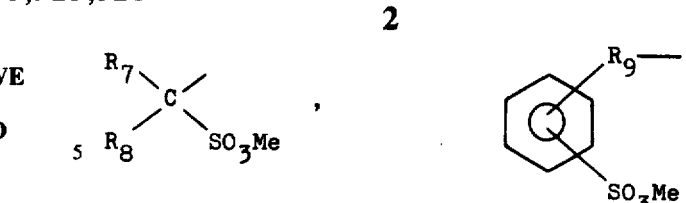

or

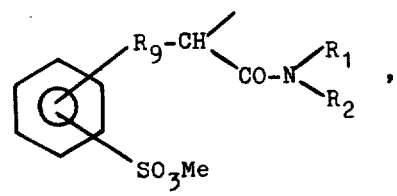

$R_5$ and $R_6$ represent groups of the following general formulae

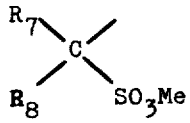 or 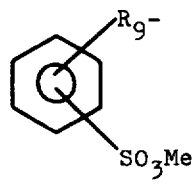

and $R_1$ represents a short chain alkyl group containing 1 to 5 carbon atoms, $R_2$ and $R_8$ represent long chain alkyl groups containing 4 to 30 carbon atoms, $R_3$ and $R_7$ represent hydrogen or a short chain alkyl group containing 1 to 5 carbon atoms, $R_4$ represents a straight chain or branched chain alkylene group containing 1 to 18 carbon atoms, $R_9$ represents a straight chain or branched chain alkylene group containing 0 to 3 carbon atoms and Me represents an alkali metal, preferably Na or K.

The sulphonate groups in the antistatic polyamide compounds are found to be particularly advantageous and in addition to reducing the electric surface resistance they have the property which is very desirable in polyamides of increasing the affinity for basic dyes. Furthermore, dyed finished products have a lower surface resistance than undyed material.

The antistatic polyamide compositions according to the invention may be prepared by adding 0.5 to 20% by weight of one or more sulphonatocarboxylic acid amides of the general formulae

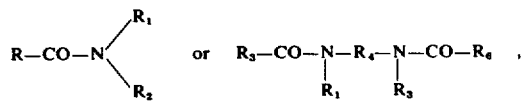

wherein

R, $R_1$, $R_2$, $R_3$, $R_4$, $R_5$ and $R_6$ have the meanings indicated above to molten linear aliphatic polyamides.

Film and fibre-forming aliphatic polyamides suitable for use as starting materials for producing the antistatic polyamide compositions according to the invention are linear polyamides or copolyamides which contain recurrent structural units of the general formulae

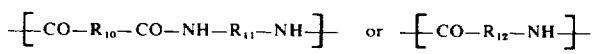

in which
R₁₀ denotes a straight chain or branched chain alkylene group containing 4 to 20 carbon atoms,
R₁₁ denotes a straight chain or branched alkylene group, a cyclohexylene group or a group of the formulae

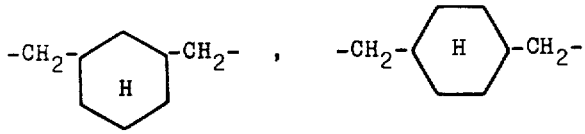

and
R₁₂ denotes a straight chain or branched chain alkylene group containing 3 to 20 carbon atoms.

Polycaprolactam and poly(hexamethyleneadipic acid amide) are preferred polymers for preparing the antistatic polyamide compositions.

The antistatic sulphonatocarboxylic acid amides are incorporated into the polyamides by, for example, stirring them into the melt. According to a particularly preferred embodiment of the invention, the desired quantity of molten sulphonatocarboxylic acid amide is added to the polyamide melt from a feed screw forming part of an extruder, and the mixture is then worked up into fibres or sheets by the usual methods.

Another object of this invention is therefore a process for preparing antistatic polyamide compositions by adding antistatically active compounds to polyamides, characterised in that sulphonatocarboxylic acid amides of the general formulae

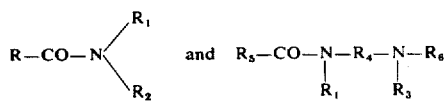

wherein
R, R₁, R₂, R₃, R₄, R₅ and R₆ have the meanings indicated above, are added to linear aliphatic polyamide melts in quantities of 0.5 to 30% by weight, based on the polyamide composition.

Suitable sulphonatocarboxylic acid amides are those which contain a tertiary amide group and which have at least one long-chain alkyl group attached to the nitrogen atom or those which are derived from a diamine which has a short chain alkyl group attached to at least one nitrogen. They are obtained from the sulphonatocarboxylic acids or their derivatives and secondary amines or diamines which contain at least one secondary amino group by the known method of solvent-free condensation or azeotropic distillation of the water of reaction.

The following are examples of suitable sulphonatocarboxylic acids: sodium sulphonatoacetic acid, potassium sulphonatoacetic acid, sodium sulphonatolauric acid, sodium sulphonatostearic acid, sodium sulphonatobenzoic acid, sodium-2-sulphonatobenzylmalonic acid, sodium sulphonatophenylacetic acid and derivatives thereof.

According to another embodiment of the invention, sulphonatocarboxylic acid amides may also be prepared from internal anhydrides of sulphocarboxylic acids such as benzoic acid-sulphonic acid endoanhydride by reacting them with amines and neutralizing the resulting sulphocarbonamides with alkali metal hydroxides.

Suitable amines for preparing the sulphonatocarboxylic acid amides include any secondary amines which have a short and a long alkyl group attached to nitrogen, e.g. N-methyldodecylamine or N-methylstearylamine, and any mono-secondary and disecondary diamines such as N-methylethylenediamine, N-methyldiaminopropane, N-isopropyldiaminohexane, N-isobutyldiaminohexane, N,N'-dimethylethylenediamine, N,N'-diethyldiaminohexane, N,N'-diisopropyldiaminohexane, N,N'-diisobutyldiaminohexane, N,N'-dibenzyldiaminohexane, piperazine, 2-methylpiperazine, 2,5-dimethylpiperazine and N,N',N''-trimethyldiethylenetriamine.

The invention is described below with the aid of examples.

The relative viscosities given in the examples refer to a 1% solution of the polyamide in m-cresol at 25°C.

The following examples are to further illustrate the invention without limiting it.

EXAMPLE 1

Sodium sulphonatoacetic acid-N-methylstearylamide 24.7 g (0.13 mol) of sodium sulphoacetic acid ethyl ester (prepared from sodium sulphite and ethylchloroacetate) and 36.8 g (0.13 mol) of N-methylstearylamine are melted in an inert atmosphere, e.g. nitrogen, in a 100 ml 3-necked flask equipped with stirrer and distillation attachment. Condensation is then carried out by raising the temperature at the rate of 20°C per hour until it reaches 250°C and then heating the reaction mixture at this temperature for one more hour. A colourless, waxy product is obtained.

EXAMPLE 2

Sodium sulphonatolauric acid-N-methylstearylamide 30.2 g (0.1 mol) of sodium sulpholauric acid (obtained by sulphonating lauric acid with sulphur trioxide) and 28.3 g (0.1 mol) of N-methylstearylamine are heated in the above described apparatus at the rate of 25°C per hour until the temperatures reaches 255°C and the melt is then condensed for another 6 hours at this temperature.

EXAMPLE 3

N,N'-Diisopropyl-N,N'-di-α-sodium-sulphonatolauroyl-1,6-diaminohexane 60.4 g (0.2 mol) of sodium sulpholauric acid and 20 g (0.1 mol) of N,N'-diisopropyl-1,6-diaminohexane are condensed in the above mentioned apparatus by raising the temperature at the rate of 20°C/hour up to 250°C and then stirring at this temperature for 2 hours.

EXAMPLE 4

3.5 Parts by weight of the sulphonatocarboxylic acid amide obtained in Example 1 from sodium sulphoacetic acid ethyl ester and N-methylstearylamine together with 66.5 parts by weight of a polycaprolactam granulate which has a viscosity of $\eta_{rel.} = 2.66$ are melted under an atmosphere of nitrogen at 275°C in a glass apparatus equipped with spiral stirrer, gas inlet tube and gas outlet and stirred for 16 minutes to form a homogeneous melt. Threads are drawn from the melt and stretched to five times their length. The electric surface resistance is measured with a high resistance ohmmeter after 48 hours' conditioning to a standard atmosphere at 23°C and 50% relative humidity (result: $1 \cdot 10^{11}$ ohm as compared with $7 \cdot 10^{12}$ ohm without additive). The threads are then washed in a washing machine at 60°C using 5 g/l of an alkaline detergent and then again conditioned to a standard atmosphere for 48 hours. The surface resistance after 10 washings is found to be $2 \cdot 10^{11}$ ohm.

EXAMPLE 5

The reaction product of N-methyldodecylamine and potassium sulphoacetic acid ethyl ester is added from a feed screw to a polycaprolactam melt ($\eta_{rel.} = 2.66$) in a quantity of 5% by weight, based on the polycaprolactam, in a double screw extruder and the polycaprolactam is spun to a 70 den yarn. The stretched threads have a surface resistance of $9 \cdot 10^{10}$ ohm after the first wash and $1 \cdot 10^{11}$ ohm after the tenth wash.

EXAMPLE 6

5 Percent by weight of a sulphocarboxylic acid amide of sodium sulpholauric acid and N,N'-diisopropyl-1,6-diaminohexane (Example 3) are added to a polyamide-66 melt ($\eta_{rel.} = 2.45$) as described in Example 5. The stretched threads have a surface resistance of $1 \cdot 10^{11}$ ohm after the first wash and a surface resistance $9 \cdot 10^{10}$ ohm after ten washes. By comparison, threads of ordinary polyamide 66 have a surface resistance of $1 \cdot 10^{13}$ ohm.

EXAMPLE 7

2-Na-Sulphonatobenzoic acid-N-methylstearylamide obtained from benzoic acid-sulphonic acid endoanhydride and N-methylstearylamine is added to the polycaprolactam melt in a quantity of 5% by weight. A yarn (25 component filaments: 100 dtex) obtained by spinning the melt from a double screw extruder has a surface resistance of $8 \cdot 10^{10}$ ohm after the first wash and $2 \cdot 10^{11}$ ohm after ten washes.

EXAMPLE 8

The sodium sulphonatocarboxylic acid amide of N-methyldodecylamine and 2-Na-sulphonatobenzyl malonic acid diethyl ester is added to a polyamide-66 melt ($\eta_{rel.} = 2.45$) as described in Example 5. The surface resistance of the resulting threads is $1 \cdot 10^{11}$ and $2 \cdot 10^{11}$ after the first and tenth wash, respectively. Threads dyed with the basic dye Astrazon Blue have a much deeper colour than that obtained when threads without antistatic additive are dyed with the same dye. After the threads have been dyed, their surface resistance is further reduced to $8 \cdot 10^{10}$ ohm.

EXAMPLE 9

A diamide prepared from sodium sulphonato-phenylacetic acid ethyl ester and N-isopropyl-1,6-diaminohexane is added to a polycaprolactam melt in a quantity of 5% by weight. A yarn (25 component filaments: 90 dtex) has a surface resistance of $7 \cdot 10^{10}$ ohm after the first wash and $9 \cdot 10^{10}$ ohm after the tenth wash.

EXAMPLE 10

The addition of 5 percent of the reaction product of N,N'-dibenzyldiaminohexane and sodium sulphonatostearic acid to a polycaprolactam melt which is then spun to a 70 den yarn results in threads which have a surface resistance of $1 \cdot 10^{11}$ ohm after the first wash and still the same resistance after the tenth wash. When the threads are dyed with the basic dye Astrazon Blue the depth of colour obtained is much greater than that obtained on untreated material and the surface resistance is even further improved, being reduced to $7 \cdot 10^{10}$ ohm.

We claim:

1. Antistatic film and fiber-forming polyamide composition consisting essentially of an aliphatic polyamide and 0.5 – 20 percent by weight, based on the polyamide composition, of a sulphonatocarboxylic acid amide of the general formulae

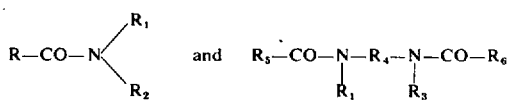

wherein
R denotes a group of the general formulae

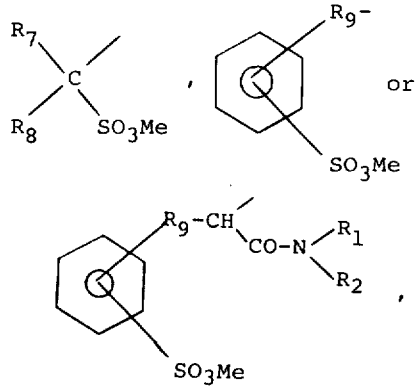

$R_5$ and $R_6$ denote groups of the general formulae

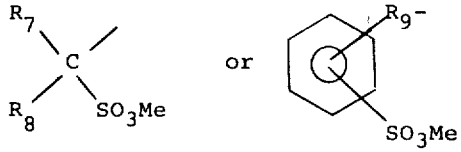

and
$R_1$ denotes a short chain alkyl group containing 1 to 5 carbon atoms,
$R_2$ and $R_8$ denote long chained alkyl groups containing 4 to 30 carbon atoms,
$R_3$ and $R_7$ denote hydrogen or short chain alkyl groups containing 1 to 5 carbon atoms,
$R_4$ denotes a straight chained or branched chain alkylene group containing 1 to 18 carbon atoms,
$R_9$ denotes a straight chain or branched chain alkylene group containing 0 to 3 carbon atoms and Me denotes alkali metals.

2. Antistatic polyamide composition according to claim 1, wherein Me represents a sodium or potassium ion.

3. Thread or sheet material of polyamide composition according to claim 1.

* * * * *